US010425457B2

(12) United States Patent
McLennan et al.

(10) Patent No.: US 10,425,457 B2
(45) Date of Patent: *Sep. 24, 2019

(54) METHOD AND APPARATUS FOR AN INTERCHANGEABLE WIRELESS MEDIA STREAMING DEVICE

(71) Applicant: Action Streamer, LLC, Cincinnati, OH (US)

(72) Inventors: Christopher S. McLennan, Cincinnati, OH (US); Edward Jay Harnish, II, Ferndale, MI (US)

(73) Assignee: Action Streamer, LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,427

(22) Filed: Jun. 5, 2018

(65) Prior Publication Data
US 2018/0295169 A1    Oct. 11, 2018

Related U.S. Application Data

(63) Continuation of application No. 15/889,510, filed on Feb. 6, 2018, now Pat. No. 10,021,157, which is a
(Continued)

(51) Int. Cl.
*H04L 29/06* (2006.01)
*H04N 5/225* (2006.01)
(Continued)

(52) U.S. Cl.
CPC ............ *H04L 65/60* (2013.01); *H04B 1/385* (2013.01); *H04L 65/4069* (2013.01);
(Continued)

(58) Field of Classification Search
CPC ..... H04L 65/60; H04L 65/602; H04L 65/607; H04L 65/4069; H04B 1/385;
(Continued)

(56) References Cited

U.S. PATENT DOCUMENTS 6,522,352 B1    2/2003   Strandwitz et al.
6,704,044 B1    3/2004   Foster et al.
(Continued)

FOREIGN PATENT DOCUMENTS

GB         201409461        7/2014
WO    WO-2013096384 A1 *    6/2013    ............... A42B 3/04
WO    WO 2015/030984 A1    3/2015

OTHER PUBLICATIONS

Apache Zookeeper, information page, Wikipedia, Mar. 3, 2016, downloaded from https://en.wikipedia.org/wiki/Apache_ZooKeeper, on Mar. 22, 2016, 1 pg.
(Continued)

*Primary Examiner* — Kostas J Katsikis
(74) *Attorney, Agent, or Firm* — Frost Brown Todd LLC

(57) ABSTRACT

It is possible to capture video information using one or more body mounted cameras, to transmit that information over a wireless communication channel, and to process that information, such as by using angular momentum information captured by gyroscopes, to obtain an image which is suitable for viewing in real time. This technology can be applied in a variety of contexts, such as sporting events, and can also be applied to information which is captured and stored for later use, either in addition to, or as an alternative to, streaming that information for real time viewing. Such video information can be captured by components fully enclosed within a hat clip enclosure that is mountable on a brim of a hat.

2 Claims, 12 Drawing Sheets

Related U.S. Application Data continuation of application No. 15/782,563, filed on Oct. 12, 2017, now Pat. No. 9,930,083, which is a continuation of application No. 15/474,410, filed on Mar. 30, 2017, now Pat. No. 9,826,013, which is a continuation-in-part of application No. 15/406,170, filed on Jan. 13, 2017, now Pat. No. 9,648,064, which is a continuation of application No. 15/336,165, filed on Oct. 27, 2016, now Pat. No. 9,591,041, which is a continuation of application No. 15/074,271, filed on Mar. 18, 2016, now Pat. No. 9,560,100.

(60) Provisional application No. 62/177,607, filed on Mar. 19, 2015.

(51) Int. Cl.
| | | |
|---|---|---|
| *H04N 7/18* | (2006.01) | |
| *H04N 9/64* | (2006.01) | |
| *H04B 1/3827* | (2015.01) | |
| *H04N 5/232* | (2006.01) | |

(52) U.S. Cl.
CPC .......... *H04L 65/602* (2013.01); *H04L 65/607* (2013.01); *H04N 5/2252* (2013.01); *H04N 5/23206* (2013.01); *H04N 7/181* (2013.01); *H04N 7/185* (2013.01); *H04N 9/646* (2013.01); *H04B 2001/3866* (2013.01)

(58) Field of Classification Search
CPC ........... H04B 2001/3866; H04N 7/181; H04N 7/185; H04N 5/2252; H04N 5/23206; H04N 9/646
See application file for complete search history.

(56) References Cited

U.S. PATENT DOCUMENTS

| | | | |
|---|---|---|---|
| 6,755,329 B2 | 6/2004 | Thompson | |
| 7,342,874 B2 | 3/2008 | Pegrum et al. | |
| 7,403,474 B2 | 7/2008 | Rorie | |
| 7,461,764 B2 | 12/2008 | Thompson et al. | |
| 7,643,550 B2 | 1/2010 | Burg et al. | |
| 7,644,318 B2 | 1/2010 | Dicorpo et al. | |
| 7,731,586 B2 | 6/2010 | Letovsky et al. | |
| 7,743,129 B2 | 6/2010 | Hua et al. | |
| 7,812,856 B2 | 10/2010 | Ortiz et al. | |
| 7,826,877 B2 | 11/2010 | Ortiz et al. | |
| 7,839,434 B2 | 11/2010 | Ciudad et al. | |
| 8,294,823 B2 | 10/2012 | Ciudad et al. | |
| 8,424,037 B2 | 4/2013 | Landow et al. | |
| 8,547,401 B2 | 10/2013 | Mallinson et al. | |
| 8,734,031 B2 | 5/2014 | Mack et al. | |
| 8,766,798 B2 | 7/2014 | Howard et al. | |
| 8,894,514 B2 | 11/2014 | Jennings | |
| 8,896,651 B2 | 11/2014 | Chu et al. | |
| 8,949,922 B2 | 2/2015 | Perlman et al. | |
| 9,063,330 B2 | 6/2015 | LaValle et al. | |
| 9,081,417 B2 | 7/2015 | Abdelsamie et al. | |
| 9,088,588 B2 | 7/2015 | Qiu et al. | |
| 9,210,725 B2 | 12/2015 | Kanamarlapudi et al. | |
| 9,282,297 B2 | 3/2016 | Siann et al. | |
| 9,298,986 B2 | 3/2016 | Ferlatte et al. | |
| 9,319,571 B2 | 4/2016 | Lyren et al. | |
| 9,337,523 B2 | 5/2016 | Kim et al. | |
| 9,389,677 B2 | 7/2016 | Hobby et al. | |
| 9,403,277 B2 | 8/2016 | Renkis | |
| 9,426,021 B2 | 8/2016 | Mendiratta et al. | |
| 9,426,500 B2 | 8/2016 | Yin | |
| 9,451,802 B2 | 9/2016 | Shearman et al. | |
| 9,516,354 B1 | 12/2016 | Verheem et al. | |
| 9,544,352 B2 | 1/2017 | Mueller et al. | |
| 9,560,100 B1 | 1/2017 | McLennan | |
| 9,578,419 B1 | 2/2017 | Abel et al. | |
| 9,584,705 B2 | 2/2017 | Nordstrom et al. | |
| 9,591,041 B1 | 3/2017 | McLennan | |
| 9,591,336 B2 | 3/2017 | Cronin et al. | |
| 9,648,064 B1 | 5/2017 | McLennan | |
| 9,661,282 B2 | 5/2017 | Manber | |
| 9,686,054 B2 | 6/2017 | Yang et al. | |
| 9,726,889 B2 | 8/2017 | Gallery et al. | |
| 9,788,586 B2 | 10/2017 | Kendis | |
| 9,826,013 B2 | 11/2017 | McLennan et al. | |
| 9,860,290 B2 | 1/2018 | Oyman | |
| 9,912,901 B2 | 3/2018 | Thompson | |
| 9,930,083 B2 | 3/2018 | McLennan et al. | |
| 9,940,508 B2 * | 4/2018 | Kaps | A63F 13/00 |
| 9,998,615 B2 | 6/2018 | Anwar et al. | |
| 2006/0053527 A1 | 3/2006 | Schneider | |
| 2006/0119574 A1 | 6/2006 | Richardson et al. | |
| 2007/0052804 A1 | 3/2007 | Money et al. | |
| 2008/0048931 A1 | 2/2008 | Ben-Ari | |
| 2008/0066215 A1 | 3/2008 | Thompson | |
| 2008/0235026 A1 | 9/2008 | Garratt et al. | |
| 2009/0034411 A1 | 2/2009 | Bernard | |
| 2009/0119819 A1 | 5/2009 | Thompson | |
| 2011/0046504 A1 | 2/2011 | Pradeep et al. | |
| 2012/0050607 A1 | 3/2012 | Sims et al. | |
| 2012/0307882 A1 | 12/2012 | Ballocca et al. | |
| 2013/0002525 A1 | 1/2013 | Foote | |
| 2013/0004153 A1 | 1/2013 | McKee et al. | |
| 2013/0222369 A1 | 8/2013 | Huston et al. | |
| 2014/0267874 A1 | 9/2014 | Ratcliff et al. | |
| 2014/0270685 A1 | 9/2014 | Letke | |
| 2014/0281012 A1 | 9/2014 | Troxler et al. | |
| 2014/0359156 A1 | 12/2014 | Manber | |
| 2015/0012234 A1 | 1/2015 | Annen et al. | |
| 2015/0058709 A1 | 2/2015 | Zaletel | |
| 2015/0063777 A1 | 3/2015 | Letke | |
| 2015/0067054 A1 | 3/2015 | Yoo et al. | |
| 2015/0074233 A1 | 3/2015 | Won et al. | |
| 2015/0090746 A1 | 4/2015 | Quinones | |
| 2015/0163283 A1 | 6/2015 | Seo | |
| 2015/0244904 A1 | 8/2015 | Bone et al. | |
| 2015/0320601 A1 | 11/2015 | Gregg | |
| 2015/0341591 A1 | 11/2015 | Kelder et al. | |
| 2016/0099025 A1 | 4/2016 | Anwar et al. | |
| 2016/0134673 A1 | 5/2016 | MacInnis | |
| 2016/0187654 A1 | 6/2016 | Border et al. | |
| 2016/0209648 A1 | 7/2016 | Haddick et al. | |
| 2016/0360160 A1 | 12/2016 | Eizenberg | |
| 2017/0262697 A1 * | 9/2017 | Kaps | A63F 13/00 |
| 2017/0264822 A1 | 9/2017 | Sehn et al. | |

OTHER PUBLICATIONS

Zookeeper, overview, The Apache Software Foundation, hadoop, Oct. 8, 2014, downloaded from https://zookeeper.apache.org/doc/trunk/zookeeperOver.pdf , on Mar. 22, 2016, 9 pgs.

Channel Allocation Schemes, information page, Wikipedia, Jan. 23, 2016, downloaded from https://en.wikipedia.org/wiki/Channel_allocation_schemes#DFS, on Mar. 22, 2016, 3 pgs.

Consul by HashiCorp, intro, Apr. 17, 2014, downloaded from https://www/consul.io and https://www.hashicorp.com/blog/consul.html, on Mar. 22, 2016, 44 pgs.

Karpenko, A., et al., "Digital Video Stabilization and Rolling Shutter Correction using Gyroscopes," Stanford Tech Report CTSR Mar. 2011, 2011, 7 pgs.

Karpenko, A., "GNI General Public License; Digital Video Stabilization and Rolling Shutter Correction using Gyroscopes Code; Version 3, Jun. 29, 2007," Github, Inc., 2011, downloaded from https://github.com/alexgo1/Video-Stabilization and https://github.com/alexgo1/Video-Stabilization/commit/03455a8bb589cb8fcb1e6900cf59bc3d8cc24078, on Jun. 23, 2016, 13 pgs.

Martius, G., "VidStab: technique," Github, Inc., 2015, downloaded from https://github.com/georgmartius/vid.stab, on Jun. 23, 2016, 6 pgs.

U.S. Notice of Allowance dated Mar. 9, 2017 for U.S. Appl. No. 15/406,170, now U.S. Pat. No. 9,648,064, 32 pgs.

(56) References Cited

OTHER PUBLICATIONS

U.S. Corrected Notice of Allowance dated Mar. 29, 2017 for U.S. Appl. No. 15/406,170, now U.S. Pat. No. 9,648,064, 9 pgs.
U.S. Notice of Allowance dated May 18, 2018 for U.S. Appl. No. 15/889,510, 25 pgs.
U.S. Corrected Notice of Allowance dated Jun. 7, 2018 for U.S. Appl. No. 15/889,510, 2 pgs.
U.S. Appl. No. 15/889,510, filed Feb. 6, 2018, by McLennan et al.
U.S. Appl. No. 62/177,607, filed Mar. 19, 2015.

* cited by examiner

METHOD AND APPARATUS FOR AN INTERCHANGEABLE WIRELESS MEDIA STREAMING DEVICE

CROSS REFERENCE TO RELATED APPLICATIONS

This is a continuation of, and claims the benefit of, U.S. non-provisional patent application Ser. No. 15/889,510, filed on Feb. 6, 2018, which itself is a continuation of U.S. non-provisional patent application Ser. No. 15/782,563, filed on Oct. 12, 2017, which is itself a continuation of U.S. non-provisional patent application Ser. No. 15/474,410, filed on Mar. 30, 2017, which is itself a continuation in part of U.S. non-provisional patent application Ser. No. 15/406,170, filed on Jan. 13, 2017, which is itself a continuation of U.S. non-provisional patent application Ser. No. 15/336,165, filed on Oct. 27, 2016, which itself is a continuation of U.S. non-provisional patent application Ser. No. 15/074,271, filed on Mar. 18, 2016, which itself is a non-provisional of, and claims the benefit of, provisional patent application 62/177,607, filed on Mar. 19, 2015. Each of those applications is hereby incorporated by reference in its entirety.

FIELD

The technology disclosed herein can be applied to the transmission and processing of streaming data. In certain preferred embodiments of the disclosed technology, streaming video is captured by cameras mounted in a self-contained hat clip enclosure at a sporting event and processed through the application of customized stabilization algorithms in real time by one or more remote devices.

BACKGROUND

When streaming data, the objective of providing high fidelity real time information must often be balanced against the need to work within technical limitations of the devices and infrastructure used in that streaming. For example, the bandwidth of the channel over which data is being streamed imposes a limit on the amount of information that the streaming data can include. Similarly, the speed with which a device is able to process data imposes a limit on the amount of data that can be streamed through that device. These limitations can become even more acute when multiple data streams have to be handled simultaneously, and when operating in a context which is subject to communication errors or other types of failures. In some contexts, these limitations can be so severe that certain types of applications, such as real time streaming of multiple video feeds over a wireless communication network, simply have not been feasible. Accordingly, there has been a need in the art for improved technology to accommodate streaming data, particularly in contexts where streaming data from multiple sources is transmitted over a failure prone communication channel and requires some level of processing for delivery.

SUMMARY

Disclosed herein is technology which can be implemented in a variety of manners, including systems and methods for allowing a plurality of video streams transmitted wirelessly from a plurality of sources to be processed and made available for viewing within limitations associated with the wireless transmission or subsequent processing of video. Other ways of implementing the disclosed technology are also possible, and so the material set forth in this summary should be understood as being illustrative only, and should not be treated as limiting.

BRIEF DESCRIPTION OF THE DRAWINGS

The drawings and detailed description which follow are intended to be merely illustrative and are not intended to limit the scope of the invention as set forth in the appended claims.

DETAILED DESCRIPTION

Disclosed herein is novel technology which can be used for a variety of purposes, including capturing, transmitting and processing video information obtained using cameras mounted on the bodies of athletes participating in a sporting event. It should be understood that, while the present disclosure focuses on embodiments in which the disclosed technology is used for transmitting and smoothing video captured using cameras mounted in football helmets, the disclosed technology can be used in other contexts as well, such as in other sports (e.g., hockey, lacrosse, skiing, baseball, etc) or in non-sporting contexts (e.g., to smooth video captured by a dashcam for a car or a wearable camera).

Figure 1:
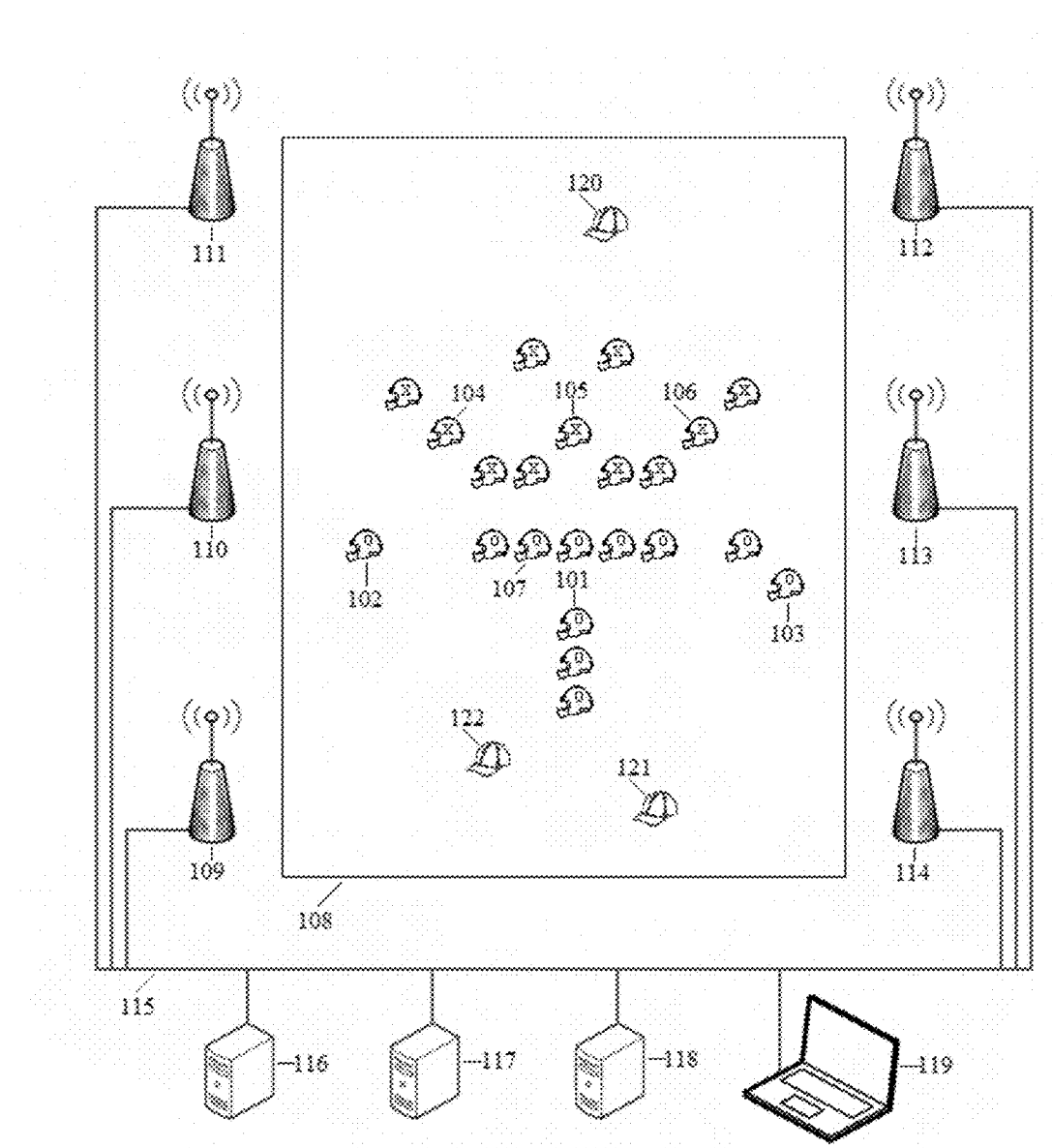
FIG. 1 depicts an environment in which aspects of the disclosed technology could be deployed.

Turning now to the figures, FIG. 1 provides a high level illustration of an exemplary environment in which a preferred embodiment of the disclosed technology could be deployed. In that figure, a number of players with instrumented helmets [101-107] are engaged in a football game officiated by a number of officials with instrumented hats [120-122] on a football field [108]. As set forth below, these instrumented helmets [101-107] and instrumented hats [120-122] could be implemented in a variety of manners to enable the capture and transmission of video data during the football game.

Figure 2:
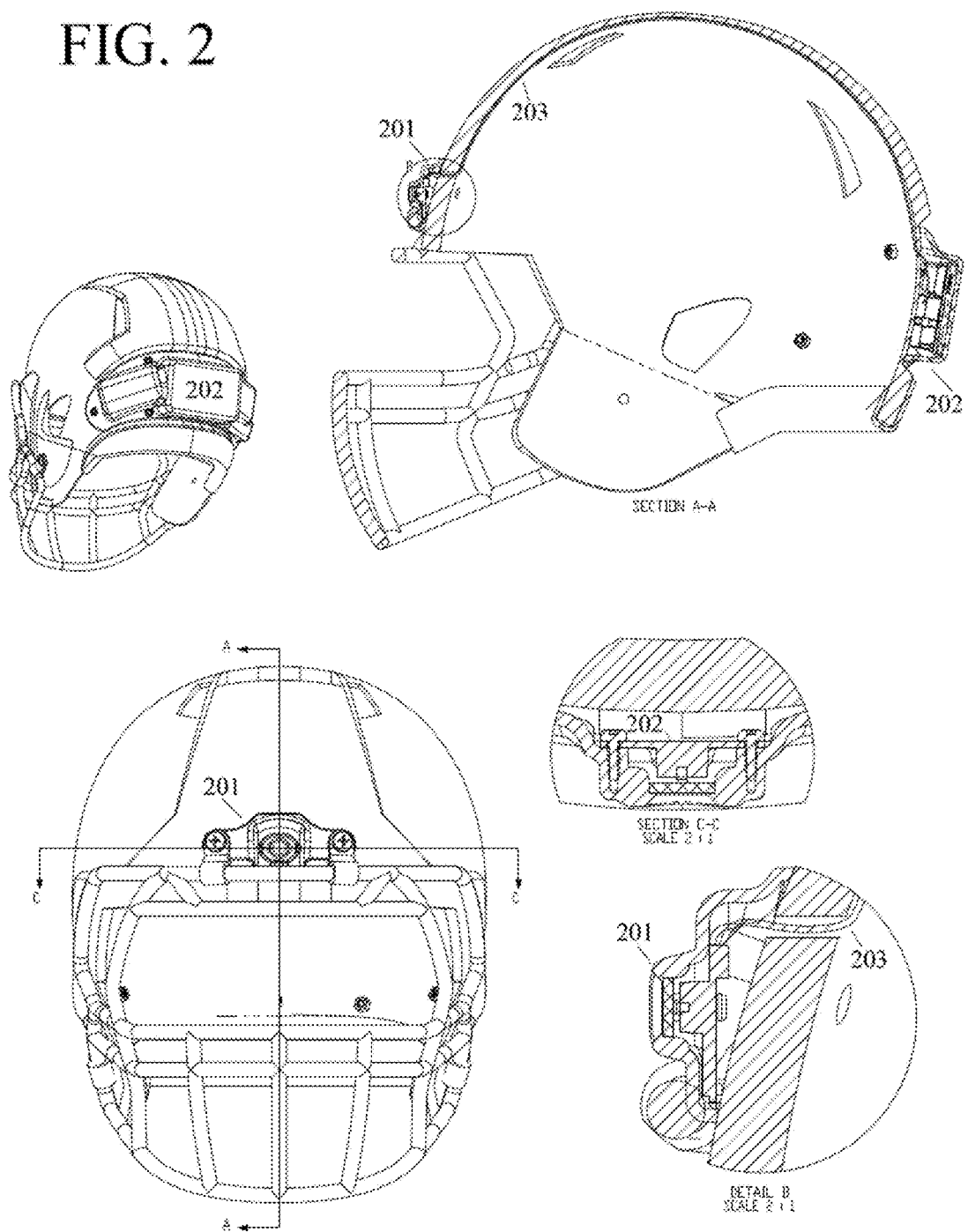
FIG. 2 depicts an exemplary embodiment of an instrumented helmet which could be used in the environment of FIG. 1.

Starting with the instrumented helmets, several views of an exemplary embodiment of an instrumented helmet are provided in FIG. 2, in which a camera [201] is affixed to a standard football helmet and connected to a control module [202] at the rear of the helmet via a wire [203]. The control module [202] would preferably include a gyroscope, processor, battery, memory, and wireless transceiver. In general, there are no specific requirements for these components, though their form factors and capabilities would likely reflect the contexts in which they are used. For example, in an instrumented helmet used to stream video, they would preferably be small and light to avoid impacting the player due to weight or bulk, and would need to have sufficient processing capability (preferably 700 MHz ARM processor or other commercially available processor with equivalent or better capabilities) to run any kind of client side software used in the video streaming (e.g., software for encoding the video data in a compressed transmission format to reduce required bandwidth, software for correlating angular velocity data with streaming data, etc).

In operation, the control module [202] would preferably enhance video data captured by the camera [201] with contemporaneous angular velocity data captured by the gyroscope (e.g., by adding time stamps to the angular velocity data which could be used to correlate specific angular velocity measurements with frames in the video). This enhanced video data would then be stored in the memory (overwriting older data with newer data as necessary if the memory becomes full) and transmitted (e.g., in the form of a raw video stream and associated time-stamped angular velocity data) to one or more remote devices in accordance with instructions received by the transceiver and stored in the memory.

Figure 6:
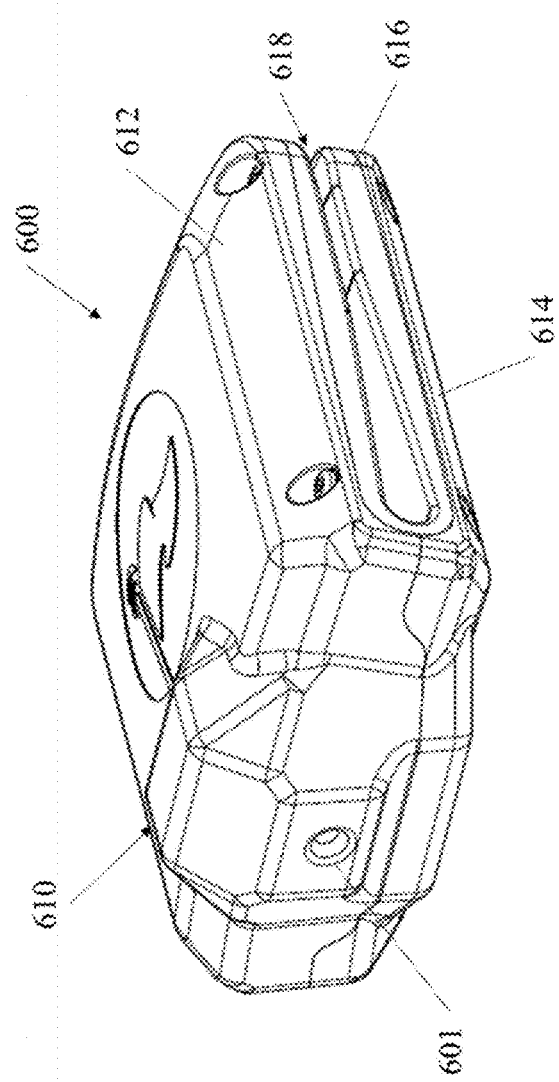
FIG. 6 depicts a top perspective view of an exemplary embodiment of a hat clip enclosure which could be used in the environment of FIG. 1.

An embodiment of a hat clip enclosure which could be added to the brim of a standard referee's hat so that that hat could be used as an instrumented hat for the purpose of capturing real time information is illustrated in FIG. 6. Such a hat clip enclosure [600] could include components which are similar to, and which operate in a manner which is similar to, those of the instrumented helmets. However, as shown in FIG. 6, a hat clip enclosure [600] will preferably completely enclose all components needed for the capture and transmission of video data, as opposed to using a control module [202] attached by a wire as in the instrumented helmet embodiment of FIG. 2.

The environment illustrated in FIG. 1 also includes a plurality of access points [109-114]. In practice, these access points [109-114] will preferably use a wireless communication channel to receive enhanced video data from the instrumented helmets [101-107] and hats [120-122] and to send instructions to those helmets and hats regarding when and how that enhanced video data should be transmitted and/or stored. The access points [109-114] will also preferably generate log files indicating any problems with these communications, such as dropped packets or interference on a particular channel.

In addition to communicating wirelessly with the instrumented helmets [101-107] and hats [120-122], the access points will preferably also communicate over a wired network [115] with a plurality of communication servers [116-118]. In operation, the communication servers [116-118] will preferably convert the enhanced video data into video streams suitable for display to a user, such as by decompressing the enhanced video data and outputting it on a specified HDMI port. The communication servers [116-118] could also perform various amounts of additional processing on the enhanced video data, such by, once the raw video and gyroscopic information from the enhanced video data are available, applying smoothing functions to the raw video using the enhanced video data's gyroscopic information (e.g., using an algorithm such as described by Karpenko, Jacobs, Baek and Levoy in *Digital Video Stabilization and Rolling Shutter Correction Using Gyroscopes*, $S_{TANFORD}$ $T_{ECH}$ $R_{EPORT}$ CTSR 2011-03, available at https://graphics.stanford.edu/papers/stabilization/karpenko_gyro.pdf the disclosure of which is incorporated by reference herein). The communication servers [116-118] could also apply smoothing software which doesn't rely on gyroscopic information, such as (e.g., ffmpeg vid-stab or one of a variety of commercially available feature recognition based products such as those offered by Microsoft (e.g., using Microsoft's hyperlapse technology) and Apple (e.g., using the stabilization feature embedded in iMovie, iPhone, and similar Apple products)). This could be done by specifying parameters for characteristics like shakiness and accuracy, and will preferably aggressively center video images on a target without scaling them. Command lines with exemplary parameters which could be used for this purpose with the ffmpeg vid-stab software are set forth in table 1:

TABLE 1

| | command lines which could be used with ffmpeg vid-stab software |
|---|---|
| 1 | ./ffmpeg -i test.MOV -vf vidstabdetect=shakiness=10:accuracy=15:result="test.trf" -strict -2 |
| 2 | ./ffmpeg -i test.MOV -vf vidstabtransform=smoothing=30:zoom=5:input="test.trf" -strict -2 output.mov |

In addition to, or as an alternative to, smoothing and/or decompression features such as described above, in some embodiments communication servers [116-118] could also provide error detection and/or correction functionality. To illustrate, consider a context in which a few seconds of delay between the events captured by the cameras on the instrumented helmets [101-107] and hats [120-122] and the display of those events to a user is acceptable. In this context, each of the communication servers [116-118] may maintain a 2-3 second buffer to store data for the video stream(s) it is processing. Then, in the event that a communication server doesn't receive one or more frames for a video stream it is processing, it could send a message to the instrumented helmet or hat which originally provided that stream instructing it, if those frames are still available in its memory, to resend them so the communication server could insert them into the appropriate buffered video stream. Of course, similar error detection and correction functions could also take place in contexts where real time display of events (e.g., no perceptible latency between an event's occurrence and its display, which in general would correspond to a buffer of between 150-200 milliseconds) is necessary, though, as would be understood by one of ordinary skill in the art, the effectiveness of such error detection and correction functions will be greater when more time is available for them to be performed.

In the environment depicted in FIG. 1, in addition to being used for communications between the access points [109-114] and the communication servers [116-118], the wired network [115] would also preferably be used for communications between a command and control computer [119] and the other devices on the network [115]. In operation, the command and control computer [119] would preferably be used to generate commands which would cause the other devices depicted in FIG. 1 to operate in a manner which is consistent with the goals of the particular application for which the disclosed technology is being deployed. For example, when the disclosed technology is deployed to handle video streams generated during a football game, if the left guard is involved in an important play, then the command and control computer [119] could send a command to that player's instrumented helmet [107] instructing it to send its video of that play at a higher frame rate and bit depth than that instrumented helmet [107] normally used.

The command and control computer [119] could also be used to perform various administrative tasks, such as associating human friendly identifiers (e.g., the name of a player, such as "Joe Smith"; name of a position such as "left guard" or "head linesman") with hardware specific identifiers (e.g., MAC addresses) so that production personnel or others could more easily control the data streams from the instrumented helmets and hats. For example, in the case where a play by play producer indicated that the left guard was involved in a particularly important play, the command and control computer [119] could translate the position specified by the play by play producer (i.e., left guard) into a MAC address for that player's instrumented helmet so that the command to increase the bid depth and frame rate could be directed appropriately without requiring the play by play producer to know a hardware identification for the left guard's instrumented helmet.

The command and control computer [119] will also preferably be configured to identify and/or predict problems and to take action to remediate them. To illustrate, consider the case where the instrumented helmets [101-107] and hats [120-122] are configured to send their data to particular ports on particular communication servers [116-118], and the communication servers [116-118] are configured to listen for the data from their helmets/hats on the specified ports. In this type of implementation, changing the parameters with which data is sent from the left guard's instrumented helmet [107] could increase the processing requirements for that data to the extent that the communication server to which that data was allocated (e.g., a first communication server [116]) could not satisfy those requirements while continuing to process the other streams which were allocated to it. To prevent this from unnecessarily degrading system performance, prior to instructing the left guard's instrumented helmet [107] to send data with parameters that would increase processing requirements (e.g., sending it at an increased frame rate and bit depth), the command and control computer [119] could calculate the increase in processing requirements which would be caused by the change, and compare the post-change processing requirements with the processing capacity of the first communication server [116]. Then, if the comparison revealed a problem, when the command and control computer [119] sends the command which would change the processing requirements, it could also reshuffle the allocation of enhanced video streams to avoid any of the communication servers being overwhelmed. For example, the command and control computer [119] could send a command to the left guard's instrumented helmet [107] which would cause that helmet to send its video data to a second communication server [117], send a command to the first communication server [116] to stop listening for the data from the left guard's instrumented helmet [107], and send a command to the second communication server [117] instructing it to listen for the data from the left guard's instrumented helmet [107] on the port designated by the command and control computer [119].

Figure 3:
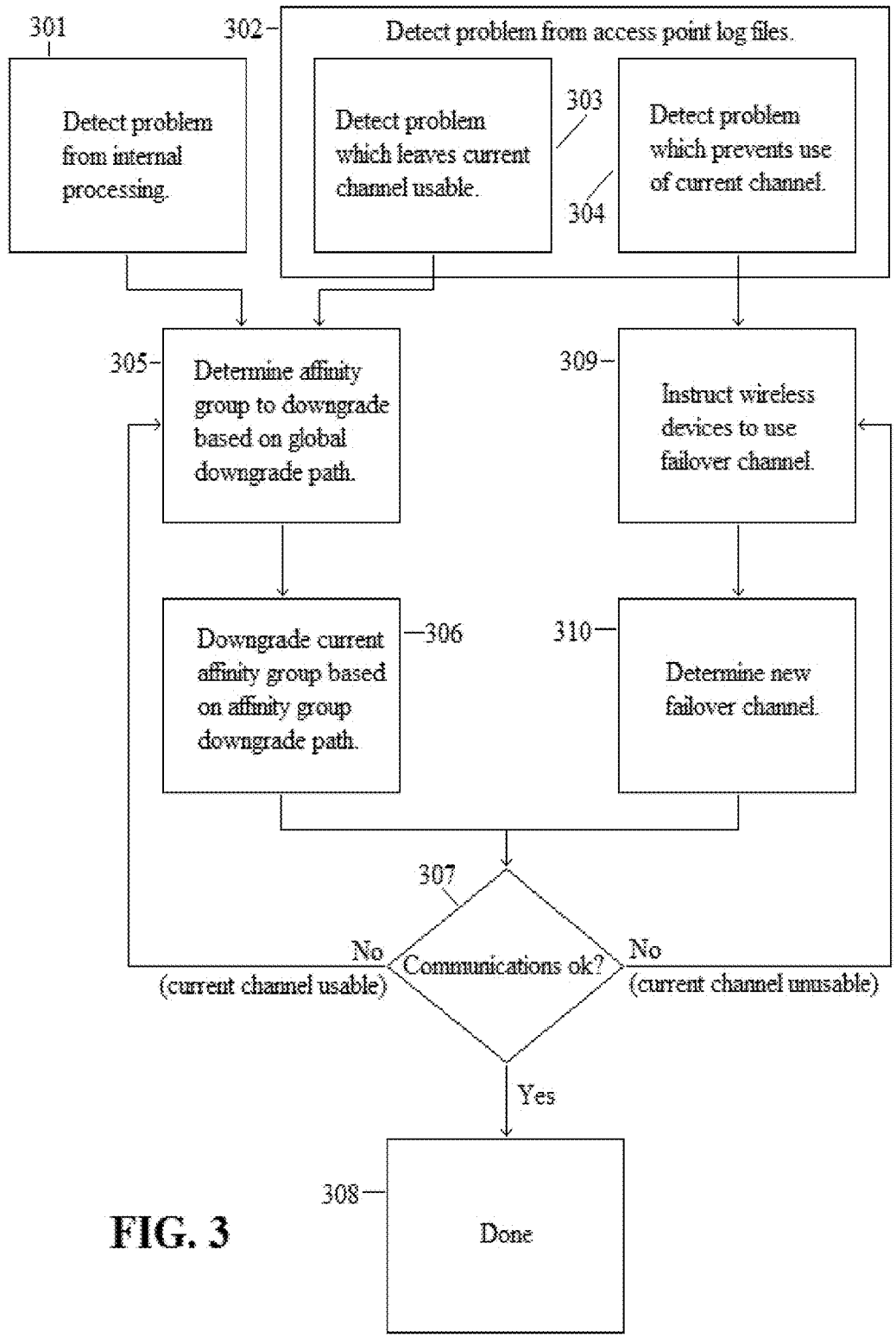
FIG. 3 depicts steps which could be used to account for problems in wireless communication of streaming data.

Of course, it should be understood that the above discussion of how a command and control computer [119] could perform problem detection and remediation functions is intended to be illustrative only, and should not be treated as limiting. To illustrate, consider FIG. 3, which depicts steps a command and control computer [119] could use to account for problems in wireless communication between instrumented helmets [101-107] or hats [120-122] and access points [109-114] rather than problems caused by limitations in processing capacity of communication servers [116-118]. In FIG. 3, initially a problem in the wireless communications will be detected [301] [302]. Such problem detection could take place in a variety of manners, and, as shown in FIG. 3, multiple approaches to problem detection could be used in a single embodiment. For example, a command and control computer [119] could detect problems using its own internal processing [301], such as by, before sending a command which will increase the bandwidth required for transmitting data from one or more of the instrumented helmets or hats, comparing the total bandwidth which would be required by all the instrumented helmets and hats after the change and a collective bandwidth limit for communications between the instrumented helmets [101-107] or hats [120-122] and the access points [109-114]. Such a command and control computer [119] could also periodically poll the access points [109-114] and use log files generated by those access points to detect a problem with the wireless communications [302] even in the absence of bandwidth needs exceeding a collective bandwidth limit.

Just as a command and control computer [119] could use different techniques to detect problems, it could detect different types of problems using those techniques. To illustrate, consider that a command and control computer [119] could be programmed to identify both problems which are consistent with communications being able to continue on the current communication channel and problems which render the current communication channel unusable. For instance, the command and control computer's internal processing indicating an incipient bandwidth over-allocation could be treated as a problem which is consistent with communications on the current channel being able to continue. Similarly, if a review of access point log files indicates an increase in dropped packets, that finding could be treated as detecting a problem (e.g., intermittent minor interference) which interferes with the current communication channel while still leaving it usable [303]. By contrast, if there is more serious interference, such as if the wireless communications are taking place in the 5 GHz band (particularly the 5470-5725 MHz range, which has traditionally been handled using dynamic frequency selection logic requiring a significant downtime after interference is detected) and the access point log files indicate a pulse consistent with utilization of the current channel by a radar system, this can be treated as detection of a problem which renders the current channel unusable [304]. Variations on these approaches, such as identifications of some types of problems as rendering a particular communication channel usable for only some purposes (e.g., a communication channel is not usable for streaming high definition full color video in real time, but is usable for transmission of reduced quality video or transmission of video after the fact rather than in real time) are also possible, and so the discussion of a command and control computer [119] splitting problems into those which do or do not render a communication channel unusable should be understood as being illustrative only, and should not be treated as limiting.

Continuing with the discussion of FIG. 3, after a problem has been detected [301][302], the command and control computer [119] could continue by taking steps to respond to the problem. For example, if the problem is one which is consistent with communications on the current channel being able to continue, a command and control computer [119] could determine how to bring the bandwidth needed for wireless communications within the limits imposed by the current communication channel, such as by using a global downgrade path to determine a set of instrumented helmets/hats (i.e., an affinity group) whose communications should be downgraded [305] in order to lower the collective bandwidth of the wireless communications. To illustrate how this affinity group based approach could operate in practice, consider that, in general, viewers are not likely to be equally interested in video streams from all of the people on the field. To account for this, instrumented helmets/hats can be grouped based on the expected interest in their video streams. Examples of these types of groupings are provided in table 2 below, though it should be understood that those groupings are presented for illustration only, and should not be treated as limiting on the ways this affinity group based approach could be implemented.

TABLE 2

Exemplary affinity groups.

| Type of Group | Example |
| --- | --- |
| Grouping based on position | The quarterback and wide receivers could be one group, offensive linemen could be another group, officials could be another group, etc. |
| Grouping based on fan activity | Players could be grouped based on their utilization in major fantasy football leagues, pro bowl votes, etc. |
| Grouping based on player activity | Players could be grouped based on whether they are considered stars or franchise players, or whether they are particularly relevant to a rivalry, etc |
| Ad hoc groupings | Players could be grouped based on whether their feeds are likely to be particularly exciting, such as the runner and those in pursuit if there is a breakthrough on a rushing play, or if their feeds are likely to have particular emotional resonance, such as a player who is being removed from the game due to injury as he or she leaving the field, etc. |

With these types of affinity groups, a command and control computer [119] operating along the lines depicted in FIG. 3 could determine which affinity group could be required to downgrade its transmissions using a predefined global downgrade path. Such downgrade paths could, for example, take the form of rules, such as a rule stating that the affinity group that should be downgraded is the affinity group with the lowest priority level which is operating in a manner for which a downgrade is possible. Alternatively, downgrade paths could take the form of sequences, such as, in an embodiment with three affinity groups, downgrading group three, then downgrading group two, then downgrading group three, then downgrading group one, then downgrading group two again, etc. Variations on these downgrade paths and ways of expressing them (e.g., via a state machine which would downgrade each group once before any group was downgraded twice) are also possible, and so the examples given above should be understood as being illustrative only, and should not be treated as limiting.

Once the affinity group to downgrade had been determined [305], the remediation steps of FIG. 3 would continue by actually downgrading that affinity group based on an affinity group downgrade path [306]. Such a downgrade path could operate in a similar manner to the global downgrade path discussed above. However, rather than indicating an affinity group to downgrade, an affinity group downgrade path could indicate how an affinity group's handling of data should be changed when it is determined that that affinity group should be downgraded. To implement this, a command and control computer [119] could be configured with sets of parameters defining how the instrumented helmets or hats should handle their data, along with downgrade paths (which could potentially be different for each affinity group) indicating how the affinity groups should progress through those sets of parameters as they are downgraded. Then, when a determination is made that a particular affinity group should be downgraded, the command and control computer [119] could send the instrumented helmets or hats in that affinity group commands which would cause them to handle their data in the manner specified by the appropriate parameter set.

To illustrate how this type of downgrading through parameter sets could work, consider a case in which a command and control computer [119] is configured with three parameter sets for streaming video, and the instrumented helmets and hats are organized into two affinity groups. These parameter sets could be, for example, a high quality streaming parameter set, in which video would be streamed at 1920×1080 resolution at a frame rate of 30 frames per second, a medium quality streaming parameter set, in which video would be streamed at 640×480 resolution at a frame rate of 42 frames per second, and a low quality streaming parameter set, in which video would be streamed at 640×480 resolution at a frame rate of 30 frames per second. Given these parameter sets, the command and control computer [119] could have a downgrade path for the higher priority affinity group of [high quality streaming parameter set→medium quality streaming parameter set→low quality streaming parameter set], and a downgrade path for the lower priority affinity group of [high quality streaming parameter set→low quality streaming parameter set]. Then, if the lower priority affinity group is currently operating using the high quality streaming parameter set and a determination is made that that affinity group should be downgraded, the command and control computer [119] could look up the downgrade path to determine that the low quality streaming parameter set should be used, then look up the parameters included in that parameter set to determine the commands to send to the helmets in the lower priority affinity group to implement the downgrade.

Of course, it should be understood that the above discussion of shifting through parameter sets using affinity group downgrade paths is intended to be illustrative only, and that the disclosed technology could be implemented in manners that vary from that discussed above. For example, rather than simply defining parameter sets in terms of resolution and frame rate, other types of parameters could be modified to change how instrumented helmets and/or hats would manage their data. Illustrative examples of parameters other than frame rate and resolution, one or more of which could be used instead of or in addition to frame rate and resolution to define the treatment of data by the instrumented helmets/hats, are set forth below in table 3.

TABLE 3

Exemplary parameters for handling data.

| Parameter | Explanation |
| --- | --- |
| Transmission mode | This parameter could indicate when data should be transmitted from the instrumented helmets. Examples of values that some implementations of the disclosed technology could be configured to support for this parameter include continuous transmission (e.g., streaming of real time video), demand based transmission (e.g., transmit a particular portion of the video stored on a helmet based on a signal from the command and control computer, such as transmitting stored video of a play based on a signal from the command and control computer triggered by the play clock indicating that that play is over), intermittent transmission (e.g., transmitting stored video on a periodic basis, or when storing additional video on an instrumented helmet would require overwriting video which had previously been captured). |
| Bit depth | This parameter could indicate how much data should be used to represent the color of each pixel. Examples of values that some implementations of the disclosed technology could be configured to support for this parameter include 8 bit color (e.g., 8 bits for each of the red, blue and green color channels), and 24 bit color (e.g., 24 bits for each of the red, blue and green color channels). |
| Color quant | This parameter could indicate how much a pixel has to change before that change will be reflected in the transmitted data. An example of a value that some implementations of the disclosed technology could be configured to support for this parameter is two bit quantization, in which a change with a magnitude that would require only one bit to represent (e.g., a change on an 8 bit red color channel from output level 0 to output level 1) would be ignored, but a change with a magnitude that would require multiple bits to represent would be reflected in the transmitted data. |
| Variable bit rate set | This parameter could indicate whether optimization functions provided by the software used to encode data for transmission (e.g., an H264 encoder) should be used to minimize bandwidth use which may be unnecessary so that more bandwidth can be freed up for more bandwidth intensive portions of the video stream. Values that some implementations of the disclosed technology could be configured to support for this parameter include the Boolean values TRUE and FALSE. |

Variations on parameters and approaches to representing downgrade paths are not the only types of variations which could be used to implement an affinity group based remediation approach. For example, in some implementations, it is possible that instrumented helmets and/or hats might be assigned to multiple affinity groups, and that those affinity groups might change dynamically during system operation. To illustrate, consider a case where instrumented helmets and hats are organized into affinity groups based on position. In such an instance, to avoid a player with a relatively high degree of fan interest being given a relatively low priority based on his or her position, it is possible that a command and control computer [119] could support players being assigned to additional affinity groups based on fan interest, then, when determining which instrumented helmets to downgrade, could treat instrumented helmets in multiple affinity groups as having the priority of their highest priority affinity group. Similarly, if a player is involved in a particularly exciting play, then that player's instrumented helmet could be added to an ad hoc affinity group (which might only include that player's instrumented helmet) with a maximum priority, thereby allowing that player's data to be transmitted with maximum fidelity even as other instrumented helmets which share a position based affinity group with that player's helmet might be downgraded. Other variations on these types of approaches (e.g., changing priorities of affinity groups and/or resetting affinity groups or priority groups after each play to avoid creep) are also possible, and so the discussion above of how helmets and/or could be downgraded based on their affinity groups should be understood as being illustrative only, and should not be seen as limiting.

Continuing with the discussion of FIG. 3, after an affinity group has been downgraded based on its downgrade path [306], a command and control computer [119] following the flowchart shown in that figure will check [307] if the downgrade has successfully remediated the problem. For example, if the command and control computer [119] detected a problem using its internal processing [301] by calculating that a command would result in the bandwidth needed to transmit data from the instrumented helmets exceeding a collective bandwidth limit, the check [307] could be to repeat the relevant calculations to determine if the collective bandwidth would still be exceeded after the appropriate affinity group had been downgraded. Once the check [307] had been made, if it indicated that the remediation had been successful, then the command and control computer [119] could treat remediation of the problem as being done [308]. Alternatively, if the check indicated that issues remained, then the command and control computer [119] could take appropriate additional remedial actions (e.g., taking different actions based on if the current communication channel appeared to still be usable, such as because there was a bandwidth over-allocation which could be addressed by further downgrades, versus needing to switch to another channel, such as based on detection of interference severe enough to render the current channel unusable).

Of course, an affinity group based downgrading approach such as described above is not the only type of remedial action that a command and control computer [119] could perform in response to detecting a problem [301][302]. For example, in the situation where a communication channel is rendered unusable, a command and control computer [119] could instruct [309] the instrumented helmets [101-107], instrumented hats [120-122] and the access points [109-114] to stop using the current channel and to communicate with each other via a failover channel instead. At this point, the command and control computer [119] would preferably also determine a new failover channel [310] (e.g., using a channel switch path similar to the downgrade paths discussed previously). In this way, if either the initial channel switch is unsuccessful (e.g., because the problem which caused the channel switch also impacted the failover channel the command and control computer [119] instructed [309] the wireless devices to use) or if another problem requiring a channel switch subsequently arises, the system will be able to seamlessly perform that switch using the newly determined [310] failover channel.

Implementations which address problems in ways which depart from FIG. 3 are also possible. For example, where wireless communications take place in the 2.4 or 3.65 GHz bands, and multiple channels within those bands are combined to maximize bandwidth, it might make sense to program a command and control computer to always respond to errors by downgrading communications from one or more instrumented helmets or hats, based on the assumption that a switch between channels will never be necessary. Alternatively, where wireless communications take place in the 5 GHz band, it might make sense to program a command and control computer [119] to always respond to an error in wireless communications by switching communication channels, based on the assumption that errors on the 5 GHz band are much more likely to have been caused by something like preemption by a radar system than something like transient interference or over allocation of bandwidth. Accordingly, the above discussion explaining how an embodiment could be implemented with multiple ways to account for detected communication problems should be understood as being illustrative only, and should not be treated as limiting.

Just as a command and control computer [119] configured to account for problems using the steps of FIG. 3 could be configured with multiple approaches to problem remediation, there are also multiple ways that such a computer could be configured to perform those steps. For example, in some implementations, the steps of FIG. 3 could be performed in a single function, with the specific steps to be performed controlled using IF . . . THEN statements or other types of conditionals. Alternatively, in some implementations, the steps of FIG. 3 could be split into different processes (or different threads of a single process), or some of the steps could be performed in one process (e.g., a single process which analyzed access point log files) while other steps could be separated from each other (e.g., there could be separate affinity group downgrading and channel switching functions which would be invoked as appropriate when a problem is detected).

Similarly, the nature of communications between devices and of problems which could be addressed could also differ from what was described above in the context of FIG. 3. For example, while the discussion of downgrading [306] an affinity group described how a command and control computer [119] could send instrumented helmets or hats commands with the parameters determined by reference to an appropriate parameter set, it is also possible that instrumented helmets or hats could be configured with the parameter sets they might be required to use, and a command and control computer [119] would simply send a command to operate according to a particular parameter set rather than specifying particular parameters to be used. Similarly, while the above discussion described how a command and control computer [119] could be configured to determine how to downgrade a particular affinity group using that group's downgrade path, it is possible that in some implementations a command and control computer [119] could be configured to send a downgrade command to the helmets or hats in the appropriate affinity group, and rely on the devices in that group determine what that downgrade would entail (e.g., by reference to downgrade paths which had previously been provided to those helmets or hats).

As another variation, while the above discussion described comparing bandwidth required by all instrumented helmets and hats with a global bandwidth limit, in some implementations a command and control computer [119] could be configured to identify wireless communication issues on the level of individual access points. For example, if particular instrumented helmets or hats are configured to communicate with particular access points, a command and control computer could be configured to make sure the access points had sufficient capacity to handle the communications with their designated devices. Then, if the command and control computer determined that an access point was in danger of being swamped, it could address the problem by reshuffling the allocation of wireless communications (e.g., by sending commands to one or more instrumented helmets instructing them to send their data to access points with different MAC addresses than those they had used previously) in a manner similar to that described for addressing over-allocation of the communication servers.

Of course, it should be understood devices in an environment such as shown in FIG. 1 be configured to provide functions either in addition to or as alternatives to the functions described above. For example, another type of functionality which a command and control computer [119] could provide to help a system implemented using the disclosed technology achieve the objectives of the particular context for which it is implemented is to upgrade the manner in which instrumented helmets could handle their video data. This could be implemented in a manner which is essentially the reverse of what was described above in the context of downgrading. That is, if a command and control computer [119] determines that there are additional resources available (e.g., if a source of transient interference disappears, thereby enabling more information to be transferred over a wireless communication channel), it could determine affinity groups to upgrade based on either a separate global upgrade path or by reversing the global downgrade path, and then upgrade those affinity groups by either reversing the downgrade paths for those groups or by applying a separate path which had been specified for upgrades.

Additionally, while the above discussion focused on capabilities a command and control computer [119] could have to address (or recover from) problems, it is possible that capabilities such as described above could also be used outside of the problem detection and/or recovery contexts. For example, rather than (or in addition to) taking place after a wireless communication problem is detected, the determination of a new failover channel could be performed on an ongoing basis during operation of the system—e.g., by continuously monitoring communications on the then designated failover channel(s) and determining new failover channels as necessary even if the channel then being used for wireless communications remains available. Similarly, rather than simply being used for responding to dynamic changes to capacity (e.g., as could be caused by transient interference), functionalities such as described above for a command and control computer [119] could also be used in other contexts. For example, the upgrading and downgrading of instrumented helmets and hats as described above could be used during system setup to properly calibrate the equipment (e.g., all instrumented helmets/hats could initially be set at their lowest/highest level, then upgraded/downgraded until no further upgrades/downgrades could be made/ were necessary to operate within the constraints of the available resources).

A command and control computer [119] could also potentially be configured to optimize various aspects of the upgrading and downgrading of the instrumented helmets and hats based on the context in which they would be used. To illustrate, consider the case where the instrumented helmets and hats would be operating in low light conditions (e.g., night games). In this type of scenario, a command and control computer [119] could use the shutter speed required by the instrumented helmets and hats to capture image to set a ceiling on the frame rates that it would instruct those helmets to use in handling their data. Thus, if a downgrade path indicated that an instrumented helmet or hat should transmit video at 60 fps, but the shutter speed needed to capture images was set at $\frac{1}{50}^{th}$ of a second, then the command and control computer [119] could instruct the cameras to transmit video at a rate of 50 fps or lower (e.g., 48 fps), despite the higher frame rate which would have been specified by following the downgrade path.

As yet another type of variation on the functionality which could be provided by a command and control computer [119], it is possible that, in some implementations, a command and control computer [119] could allow a user to specify some aspects of how the system should operate. For example, rather than relying solely on use of global or affinity group specific downgrade paths, some embodiments could allow a user of a command and control computer [119] to simply specify the parameters for handling data, either based on his or her own estimation of what is appropriate, or based on information provided to him or her regarding the performance of the system (e.g., percentage of dropped packets, etc).

Combined approaches are also possible. For example, a command and control computer [119] could allow a human to set some parameters, and could then operate to optimize the remaining parameters within the constraints set by the human's choices. To illustrate, consider the case where a human (e.g., a replay producer) decides that video of the preceding play captured by a helmet whose video would normally be stored for subsequent use (e.g., during training) should be made available for streaming to fans (e.g., in the form of an instant replay). To support this type of decision making, a command and control computer [119] which might normally operate on its own to determine how video is handled could present an interface which would allow the user to send an atomic start/stop command to the relevant helmet, which command would cause the helmet to transmit data from its memory starting with a set time (e.g., when the play clock for the most recent play began) and ending with the receipt of the start/stop command. Similarly, if a human decided during a play that video which would normally be cached on a helmet should be streamed (e.g., because the player wearing that helmet was doing something particularly exciting), he or she could send a command to change the transmission mode for that helmet, and the command and control computer [119] could then try to optimize the way the remaining helmets handled their data in order to accommodate the human's decision within the constraints imposed by the system's available resources. The disclosed technology could also be implemented in systems which could allow other types of commands to be sent to the instrumented helmets or hats. For example, instrumented helmets/hats could be sent commands to cause them to reboot, update their software/firmware, take and transmit a static picture, and/or chirp back diagnostic information (e.g., battery life, signal strength, storage space, CPU temperature, etc). Accordingly, the above discussion of control of instrumented helmets via a command and control computer should be understood as being illustrative only, and should not be treated as limiting.

Of course, a command and control computer [119] could allow user involvement in other aspects of the system in addition to, or instead of, how data is treated by the instrumented helmets and hats. For example, in some implementations, a command and control computer [119] could allow video processing, such as the smoothing described previously, to be customized by an operator. To illustrate, consider the case where smoothing is performed by taking a raw video stream, calculating pixel offsets based on gyroscopic data provided from the instrumented helmets or hats, then using those pixel offsets to translate and crop the raw video to obtain a processed video stream. In this type of context, a command and control computer [119] could be configured to present an interface such as shown in FIG. 5 to allow a user to control the extent to which those offsets are applied to a particular video stream.

Figure 5:
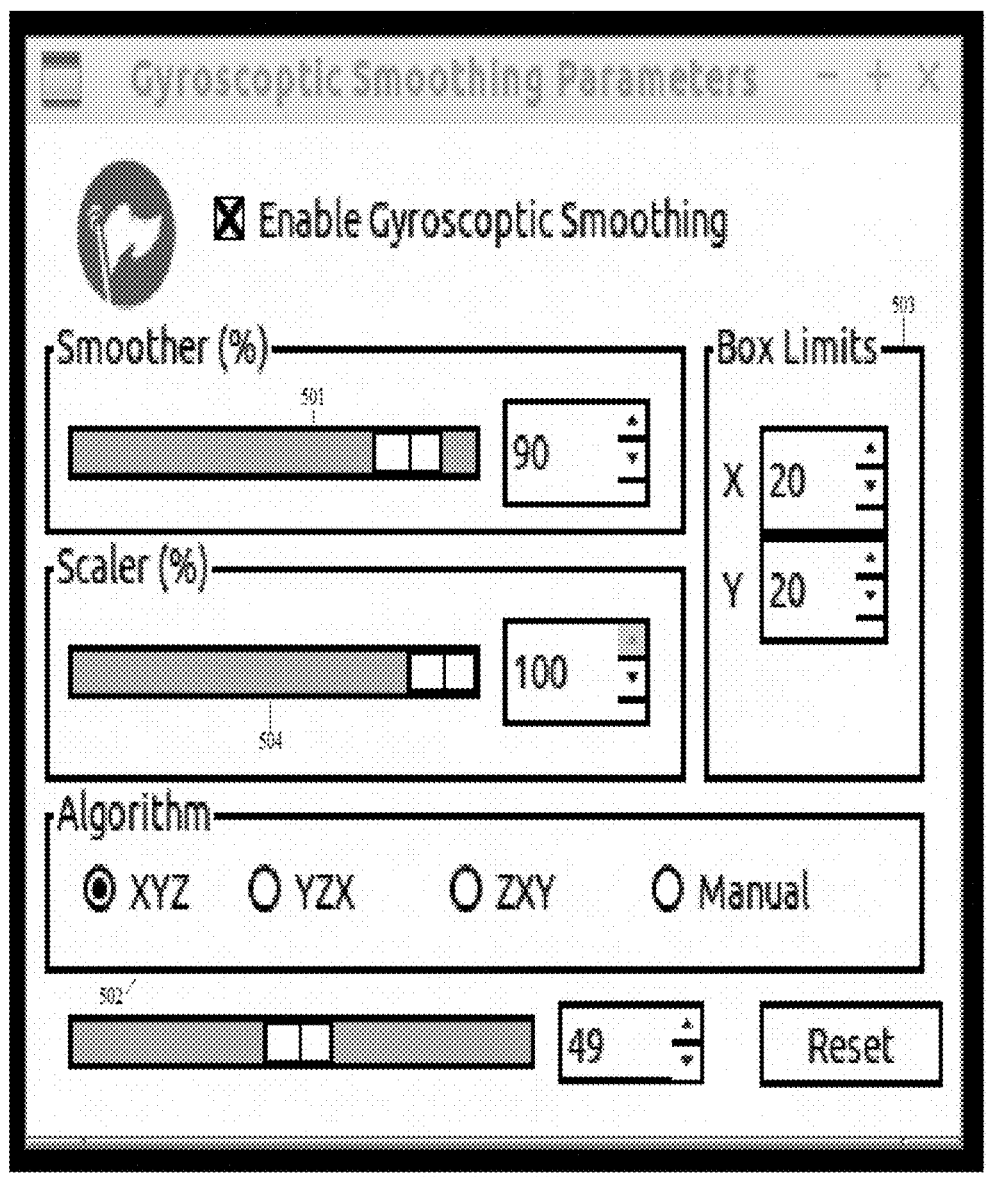
FIG. 5 depicts an exemplary interface which could be used to determine the extent to which smoothing offsets should be applied to a video stream.

In the interface of FIG. 5, the user is presented with a smoothing slider control [501] which can be used to moderate the impact of smoothing software on a video stream. For example, if the user sets a smoothing slider control [501] in an interface such as shown in FIG. 5 at 50% and the X-offset for a particular frame was +20 pixels, then instead of moving that frame 20 pixels, the frame could only be moved 10 pixels in the smoothed video stream. An interface such as shown in FIG. 5 could also allow a user to control other aspects of how a video stream is processed. For example, an algorithm orientation control [502] could be used to specify how an XYZ axis used to specify angular velocity should be mapped to the XYZ axis of an incoming video stream (e.g., XYZ=XYZ, XYZ=YZX, XYZ=gyroscope axis modified by some manually specified rotation). Similarly, a limit control tool [503] can allow the user to specify how much of each frame of raw video data could potentially be cut off to create the viewable video stream, and therefore how much smoothing could potentially take place (e.g., if the raw video data had a resolution of 100×100 pixels, then the user could specify that 20 pixels should be cut off in both the X and Y directions, resulting in a 80×80 final image which could potentially have been translated by 20 pixels for smoothing). The user could also be provided with a scaler slider control [504] which could allow him or her to specify that a raw video stream should be zoomed in as part of its processing (e.g., if 25% of a raw video stream is taken up by the sidelines, a scaler slider control could be used to specify that only 75% of the image should be shown so that only the (presumably) more interesting portion would be included in the final stream).

It should be noted that, while FIG. 5 illustrates only single instances of its various tools (e.g., only a single scaler slider control [504]), preferably if a user is allowed to modify the processing of video streams, he or she will be allowed to modify the processing of each stream individually, rather than only being able to make global changes that would be applied to all streams. In this way, a command a control computer can [119] allow the user to specify that some level of smoothing should be performed on the enhanced video streams, while still recognizing that completely eliminating the perceptible effects of camera movement could result in a boring video stream in which it is difficult to determine what is going on, and that different levels of processing might be optimal for different video streams (e.g., because different playing styles of different players might result in video streams which are more or less jerky).

It should be noted that, while the above example indicated that offsets could be obtained from existing software, the disclosed technology can be implemented in a manner that would still allow for customization of the kind described above without requiring smoothing software that provides offsets as output. This could be done, for example, by, instead of moderating the effect of smoothing software by changing offsets that the software produces, moderating the effect of the smoothing software by changing the gyroscopic data that is provided to the software as input. For instance, frame to frame changes in angular velocity could be smoothed by providing the smoothing algorithm a rolling average of a angular velocity data over a user specified period (e.g., over the preceding 500 milliseconds). Similarly, a formula could be applied to angular velocity data which would use a user specified value to determine relative contributions of current and preceding measurements. An example of this type of formula is provided below in equation 1:

$$\omega_{out} = \text{Avg}(\omega_{n-1} \ldots \omega_{n-m}) * R + \omega_n * (1-R) \quad \text{Equation 1}$$

In that equation, $\omega_{out}$ is the angular velocity value which would be provided to the smoothing function. R is a (preferably user-specified) percentage contribution of previous angular velocity measurements. $\omega_n$ is the angular velocity corresponding to the current frame. $\omega_{n-1}$ is the angular velocity corresponding to the most recent preceding frame, and $\omega_{n-m}$ is the angular velocity corresponding to the last frame considered for the smoothing (e.g., if the smoothing was performed using the most recent 500 ms of data, and the frame rate was 60 fps, then $\omega_{n-m}$ would be the angular velocity corresponding to the 30$^{th}$ most recent frame). Approaches to mitigating the impact of smoothing software which modify data provided to that software as input but do not combine current and past data are also possible. For example, angular velocity data could be mapped to a logarithmic scale, so that extreme velocity measurements wouldn't result in more subtle changes being swamped.

It is also possible, that, rather than modifying angular velocity data provided to smoothing software as input, that software could be used to determine equations for calculating offsets, then offsets provided by those equations could be treated as if they had been provided by the smoothing software itself for the purpose of processing a video stream. For example, in a case where smoothing software is used which does not make offsets available, equations for determining offsets based on gyroscopic data in the enhanced video stream can be obtained by comparing the center positions (for X and Y offsets) and size (for the Z offset) of a prominent feature (e.g., a logo) in raw and smoothed video streams, then providing the gyroscopic data along with the information obtained via that comparison to a non-linear solver to obtain best fit equations for use in determining offsets using gyroscopic data going forward (e.g., x_pixel_offset=$-1.691497746 \cdot 10 \cdot 10^{-2}(e^{-1.176028582 \cdot 10^{-2} \ gyroX} - e^{-1.691497746 \cdot 10^{-2} \ gyroX})/(-1.691497746 \cdot 10^{-2} + 1.176028582 \cdot 10^{-2})$). Accordingly, the discussion above of use of existing software for obtaining offsets should be understood as being illustrative only, and should not be treated as limiting.

Of course, it should be understood that this type of offset customization may not be present in all embodiments (e.g., video could be smoothed on the instrumented helmets, and that smoothed video could be passed through the system without further modification), and even in implementations where it is performed, it does not have to be performed by a command and control computer [119]. For example, in some embodiments, it is possible that unsmoothed video could be provided to apps used to display a football game via mobile devices, and those apps would allow the users of the mobile devices to apply their own customized smoothing to the game as it is displayed to them, just as the user of the command and control computer [119] was enabled to customize the smoothing in the example set forth above.

Figure 4:
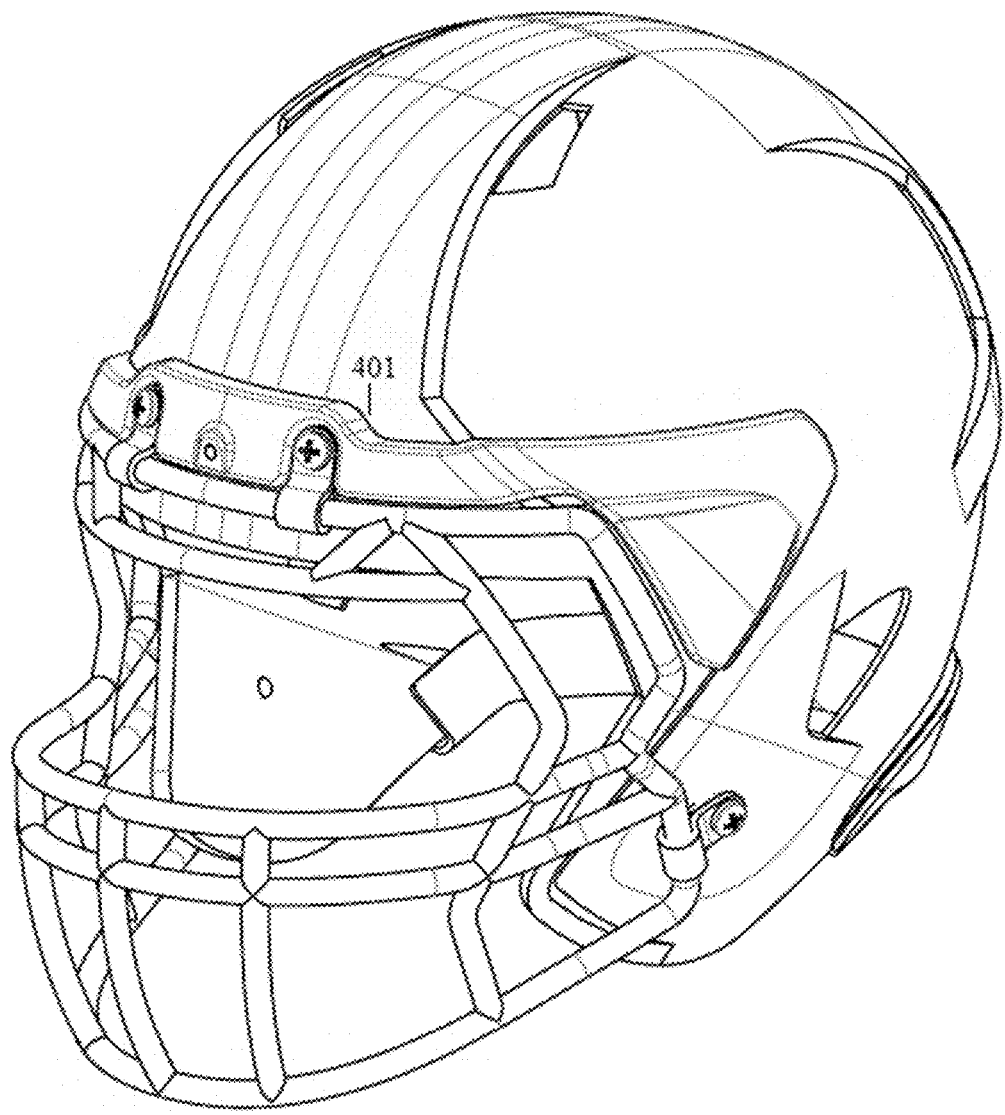
FIG. 4 depicts an exemplary embodiment of an instrumented helmet which could be used in the environment of FIG. 1.

Variations on hardware are possible beyond simply using devices not shown in FIG. 1 to enable customized smoothing. For example, an instrumented helmet, rather than using a design such as shown in FIG. 2, could use a design where all components are housed within a single casing [401], such as shown in the design of FIG. 4, which could be snap-fit, friction-fit and/or adhered to a helmet such that no holes are needed to be drilled into the helmet itself. Similarly, rather than simply using a front facing camera, it is possible that video information could be captured using multiple cameras, a 360 degree camera, or a fisheye lens, which would have the beneficial effect of allowing a greater field of view to be represented in the video information (e.g., for the purpose of allowing viewers to know what is visible in a player's peripheral vision). As a further variation, different hardware could be used for capturing information for use in enhancing the video data, such as by replacing a gyroscope with an accelerometer, or by using a combination of gyroscopic and accelerometer measurements rather than relying on information from either of those types of devices alone.

Different types of transmitters could also be used. For example, it is possible that video information could be streamed using standard ISM frequencies such as 2.4 GHz or 5 GHz, or that more regulated frequencies such as 3.65 GHz could be used. Alternatively, frequencies such as 60 GHz could be used, which provides higher bandwidth at the cost of shorter range. It is also possible that additional components could be incorporated into instrumented helmets and/or hats to accommodate different types of transmissions. For example, in some implementations, instrumented helmets or hats could include components which would normally work in the 5 GHz band but, due to the possibility of that band being preempted for use by radar systems, could also include transverters to allow them to send and receive information on the 3.65 GHz band.

Changes to support different types of transmission technologies beyond modifications to instrumented helmets are also possible. For example, in a case where 60 GHz transmissions are used, a field could be instrumented with receivers placed in (or under) the grass to allow for reception of signals despite the relatively short range of 60 GHz transmissions. It is also possible that helmets or hats might be connected using phased array antenna and mesh network technology such that if one device was unable to establish a connection with a remote server, it could tie into another which would relay the information. Other variations, such as placing a receiver above the field of play (which could be useful in implementations where information is transmitted using some kind of line of sight technology to avoid communications being broken by obstructions between instrumented helmets and receivers on the side) are also possible and will be immediately apparent to those of ordinary skill in the art. Accordingly, the description of variations above should be understood as being illustrative only, and should not be treated as limiting.

It should be understood that, while this disclosure has focused on how information can be streamed in an environment such as shown in FIG. 1, that environment is itself intended to be only illustrative, and should not be treated as limiting. For example, in FIG. 1, only seven of the player's helmets are identified as being instrumented helmets, but it is possible that more of the helmets (e.g., all of them) or fewer of the helmets (e.g., only 1-2) might be instrumented in a particular implementation. Similarly, while FIG. 1 illustrates six different access points, it is possible that more (e.g., one access point for each instrumented helmet) or fewer (e.g., one access point for each team) access points might be used. Indeed, a test implementation of the disclosed technology was found to be entirely operational with two instrumented helmets (those of the quarterback and a receiver) and four instrumented hats (on the referees) transmitting video in the form of UDP packets at a rate of 20 MBps to three access points which each had a bandwidth of 300 MBps. Of course, other variations, both for testing and operational deployment, are also possible, and could be implemented by those of ordinary skill in the art in light of this disclosure.

Figure 7B:
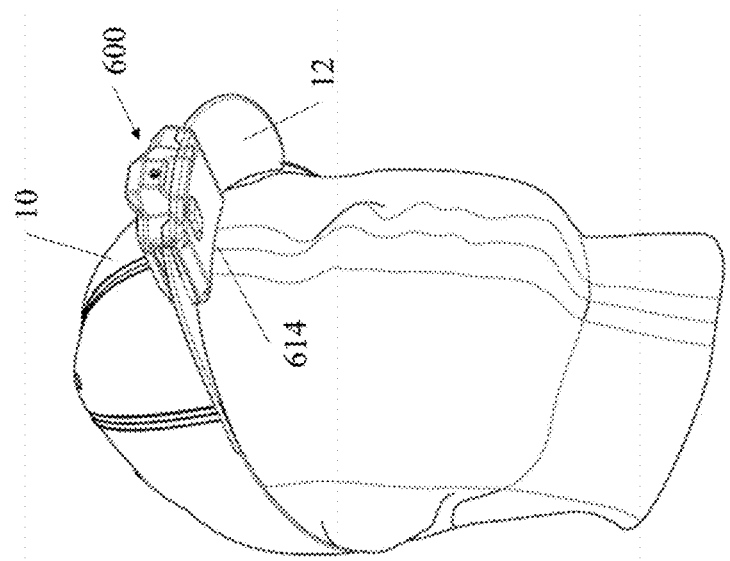
FIG. 7B depicts a bottom perspective view of the hat clip enclosure of FIG. 6 coupled to a brim of a hat.
Figure 7A:
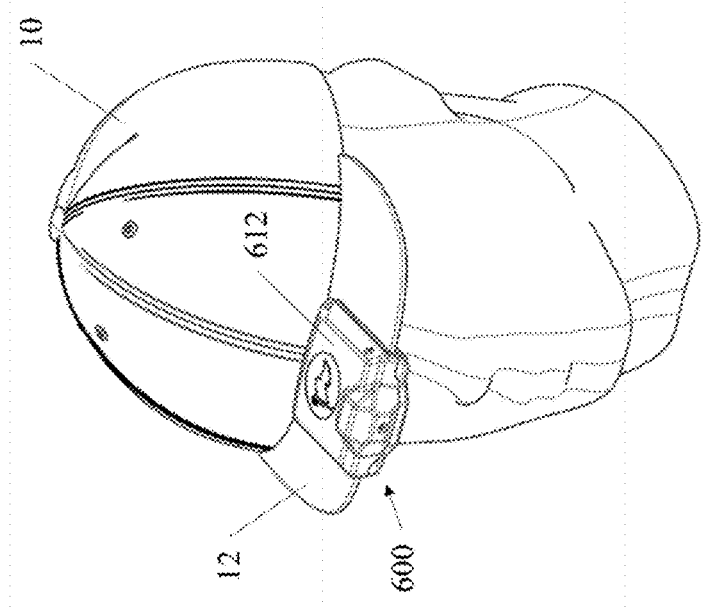
FIG. 7A depicts a top perspective view of the hat clip enclosure of FIG. 6 coupled to a brim of a hat.
Figure 8:
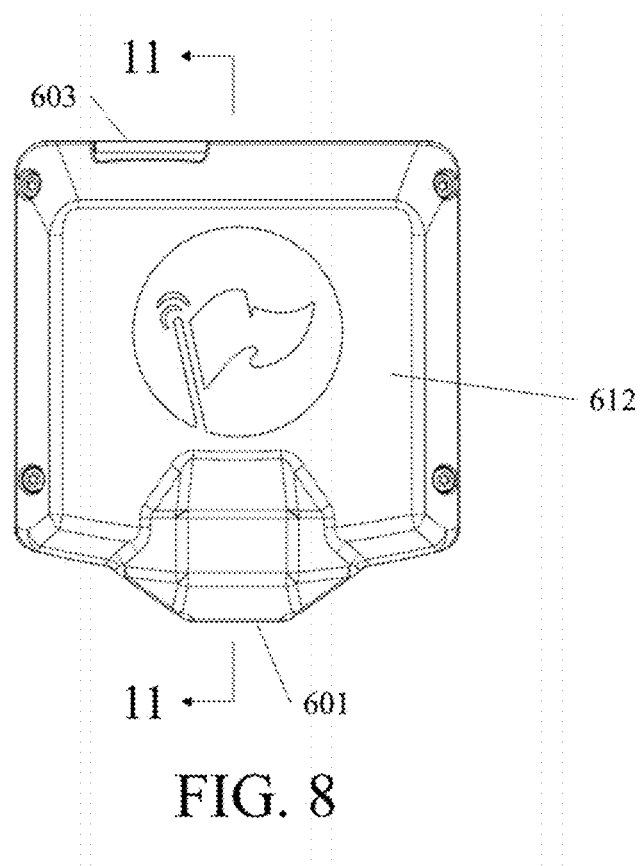
FIG. 8 depicts a top plan view of the hat clip enclosure of FIG. 6.
Figure 9:
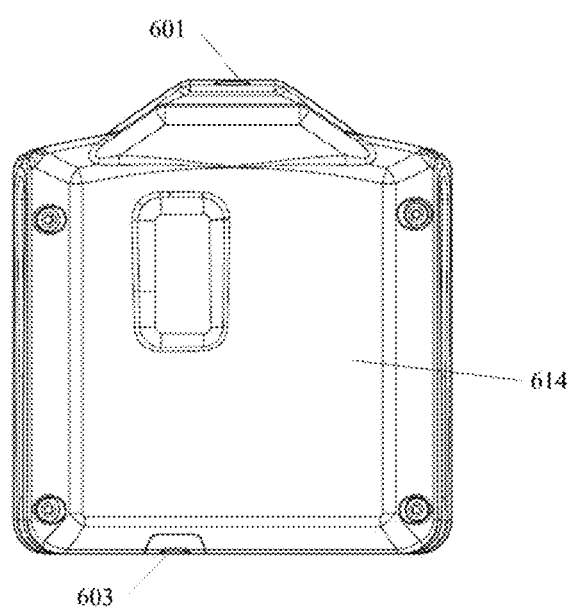
FIG. 9 depicts a bottom plan view of the hat clip enclosure of FIG. 6.
Figure 10:
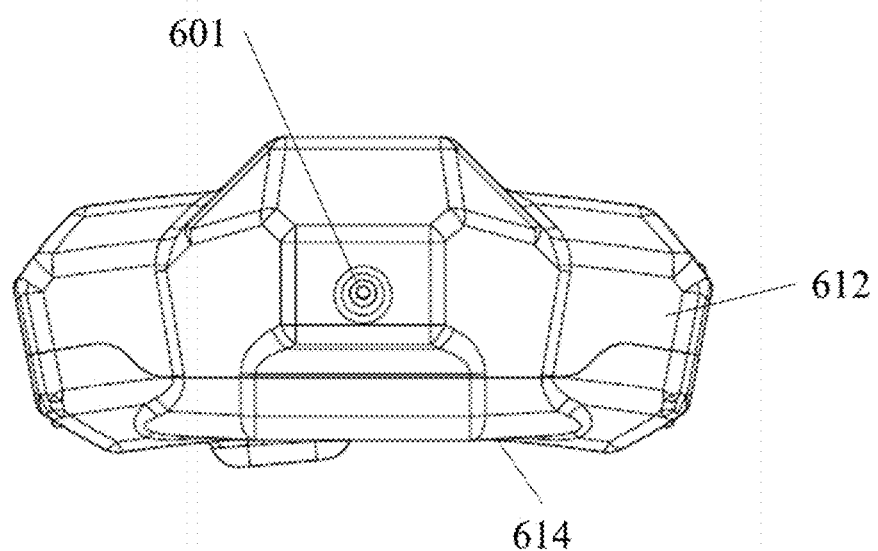
FIG. 10 depicts a front view of the hat clip enclosure of FIG. 6.

Turning now to the instrumented hats, the instrumentation for those hats can be similar to, and can operate in a manner similar to, that described above for the instrumented helmets. FIG. 6 shows an exemplary embodiment of an enclosure which can be added to the brim of a hat so that hat could be used as an instrumented hat to capture real time information regarding a football game. In the illustrated embodiment, the hat clip enclosure [600] comprises a case [610] having an outer top case [612], an outer bottom case [614], and an interior case [616]. The interior case [616] defines a recess [618] that is configured to receive a brim [12] of a hat [10], as shown in FIG. 7. A camera [601] is positioned at the front of the hat clip enclosure [600].

Figure 13:
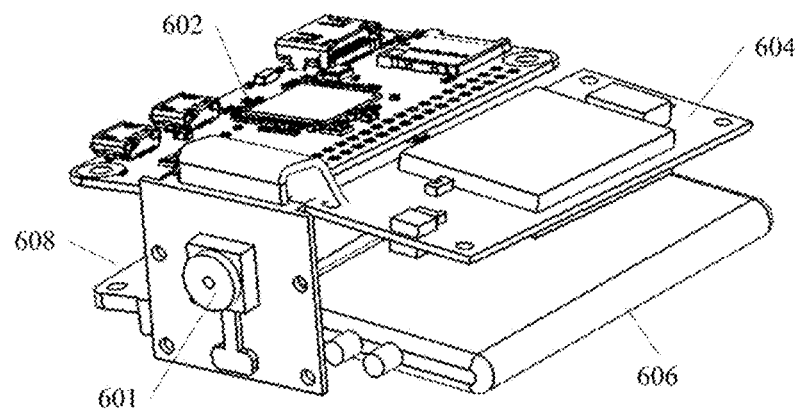
FIG. 13 depicts a top perspective view of the hat clip enclosure of FIG. 6 with the case removed.
Figure 14:
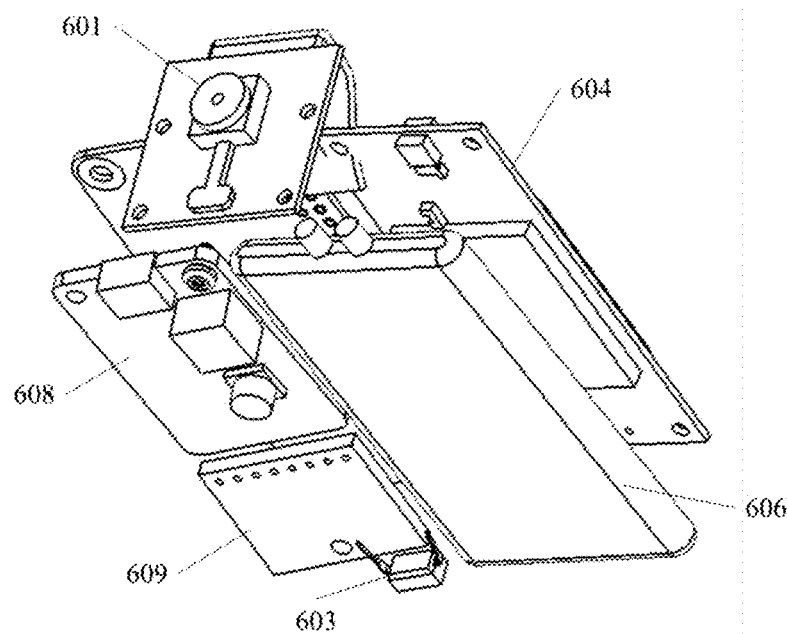
FIG. 14 depicts a bottom perspective view of the hat clip enclosure of FIG. 6 with the case removed.
Figure 15:
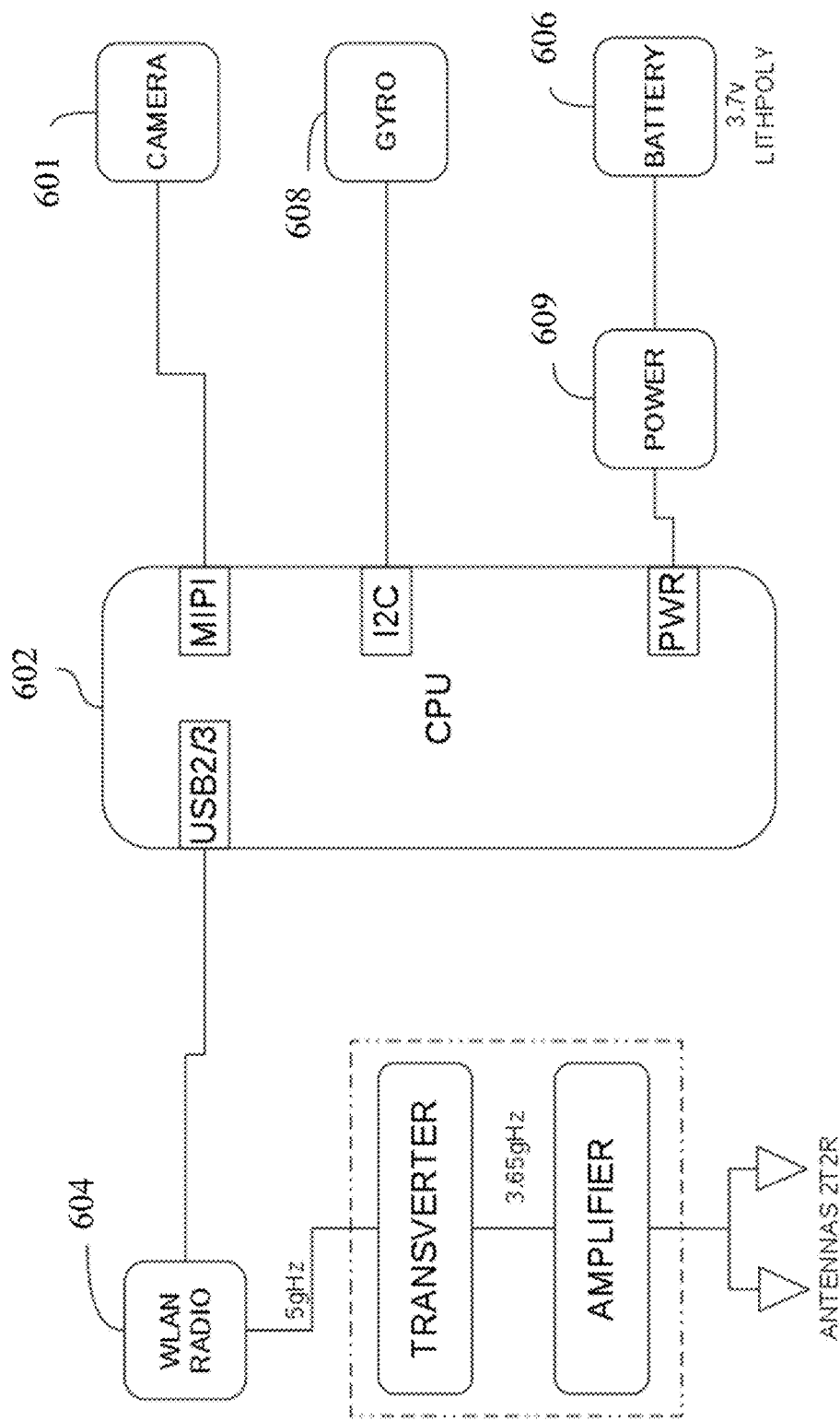
FIG. 15 depicts a schematic of the hat clip enclosure of FIG. 6.

FIGS. 8-15 show the hat clip enclosure [600] in more detail. As shown in FIG. 15, the hat clip enclosure [600] comprises a camera [601], a gyroscope [608], a battery [606], a power management system [609], and a radio [604] coupled to a control module [602]. The camera [601] can include a Sony IMX219 image sensor, which provides about 8.08M effective pixels and video imaging at about 30 frames per second. Such a sensor is about 4.6 mm in the diagonal direction. The gyroscope can include a STMicroelectronics L3G4200D motion sensor, which has a size of about 4 mm by about 4 mm by about 1 mm. The battery [606] can supply about 3.7 V to power management system [609]. The power management system [609] can then convert the voltage to about 5 V. The power management system [609] can include a Texas Instruments TPS61030 boost converter, which has a size of about 5 mm by about 4.4 mm. The radio [604] can include a Ralink RT3572 Wireless Network Adapter to connect with other devices. The control module [602] can include a Broadcom 2836 CPU. Of course, other suitable components can be used for hat clip enclosure [600], as is illustrated in FIG. 15, and will be apparent to one with ordinary skill in the art in view of the teachings herein.

Figure 12:
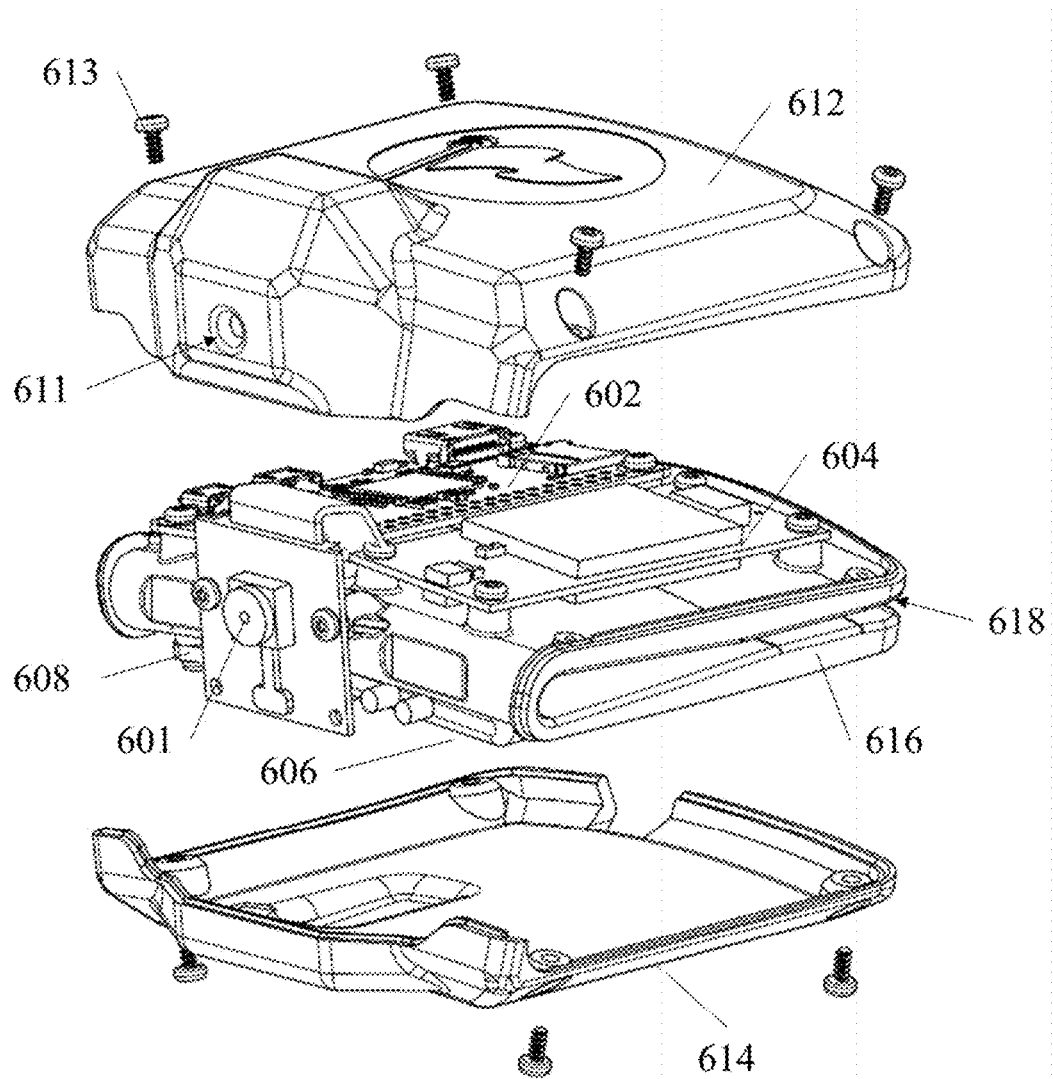
FIG. 12 depicts an exploded view of the hat clip enclosure of FIG. 6.

As shown in FIGS. 12-14, the electronic components described above can be fully positioned within the hat clip enclosure [600]. In the illustrated embodiment, the camera [601] is positioned vertically along the front portion of the hat clip enclosure [600] between a front wall of the outer top case [612] and the interior case [616]. The outer top case [612] defines an opening [611] that aligns with the camera [601] to allow the camera [601] to capture video data through the case [610]. The radio [604] and the control module [602] are positioned adjacent to each other and extend longitudinally along a top portion of the hat clip enclosure [600] between a top wall of the outer top case [612] and the interior case [616]. The battery [606] is positioned underneath the radio [604] such that the battery [606] extends longitudinally along a bottom portion of the hat clip enclosure [600] between a bottom wall of the outer bottom case [614] and the interior case [616]. The gyroscope [608] is positioned underneath the control module [602] such that the gyroscope [608] extends longitudinally along a bottom portion of the hat clip enclosure [600] between a bottom wall of the outer bottom case [614] and the interior case [616] adjacent to the battery [606]. The power management system [609] is positioned rearward of the gyroscope [608] such that the power management system [609] extends longitudinally along a bottom portion of the hat clip enclosure [600] between a bottom wall of the outer bottom case [614] and the interior case [616]. A power switch [603] is provided adjacent to the power management system [609].

Of course, the components of the hat clip enclosure [600] can positioned in any suitable configuration that will be apparent to one with ordinary skill in the art in view of the teachings herein. For instance, the components can be distributed substantially symmetrically within the hat clip enclosure [600]. This can help with distributing the weight of the components more evenly. The components can also be aligned to narrow the hat clip enclosure [600]. This can allow a user to more easily customize the curve of the hat brim while the hat clip enclosure [600] is installed. Accordingly, the hat clip enclosure [600] can include a width along the front of the hat brim of about 80 mm, a length extending rearward along the hat brim of about 84 mm, and a thickness of about 38 mm. The hat clip enclosure can weigh about 100 grams. Still other suitable dimensions can be used that will be apparent to one with ordinary skill in the art in view of the teachings herein.

Figure 11:
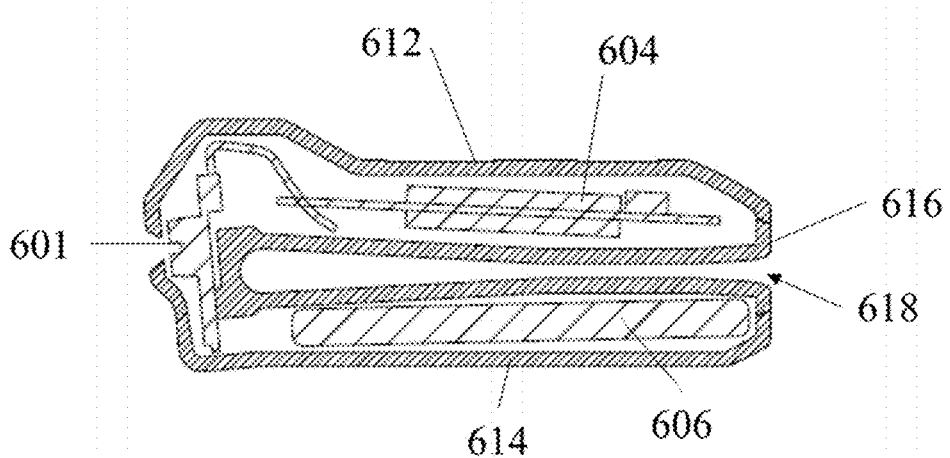
FIG. 11 depicts a cross-sectional view of the hat clip enclosure of FIG. 6 taken along line 11-11 of FIG. 8.

The case [610] of the hat clip enclosure [600] is configured to fully enclose the components of the hat clip enclosure [600] such that the video streaming components are self-contained within the case [610]. As shown in FIG. 12, the case [610] of the hat clip enclosure [600] can be coupled with screws [613], or any other suitable fastener. The case [610] can be made of a plastic material, or any other suitable material, such that the case [610] is sufficiently rigid to protect the video streaming components, yet the case [610] is configured to slightly flex when it is installed on a hat. The case [610] can be made by 3D printing, injection molding, or any other suitable method. As best seen in FIG. 11, the interior case [616] defines a recess [618] that is configured to receive the brim of a hat. The recess [618] extends from a central portion of a rear end of the interior case [616] to a front portion of the interior case [616] adjacent to camera [601]. In the illustrated embodiment, the recess [618] is tapered such that the recess [618] is more narrow at the rear end of the interior case [616]. Recess [618] thereby allows the hat clip enclosure [600] to be slid onto the brim [12] of a hat [10] and held on the brim [12] by a friction fit.

Accordingly, in use, the hat clip enclosure [600] can be installed on a hat [10], as shown in FIG. 7, by positioning the rear end of the hat clip enclosure [600] adjacent to the brim [12] of the hat [10] such that the recess [618] of the hat clip enclosure [600] is aligned with the brim [12]. The hat clip enclosure [600] can then be slid rearward onto the brim [12] to insert the brim [12] within the recess [618] until the front end of the brim [12] abuts the front wall of the recess [618]. As the brim [12] is inserted within the recess [618], the case [610] of the hat clip enclosure [600] flexes slightly outward. The case [610] thereby provides a friction fit to hold the hat clip enclosure [610] on the brim [12]. Still other configurations for holding the hat clip enclosure [610] on the hat [10] will be apparent to one with ordinary skill in the art in view of the teachings herein. In the present embodiment, the hat clip enclosure [600] is positioned on the hat [10] such that the length of the hat clip enclosure [600] extending rearwardly on the brim [12] is greater than the width of the hat clip enclosure [600] extending along the front of the brim [12].

As set forth above, an instrumented hat will preferably be instrumented using a hat clip enclosure in which all components are contained within the enclosure itself. This type of configuration can provide a variety of benefits. For example, containing all components within the enclosure itself can make it possible for a user to move more easily without being bothered by cables, belt clips or other external devices. Similarly, containing all components within the hat clip enclosure itself makes it easier to service the device (if necessary). For example, with the instrumentation completely enclosed, the problem of a battery being drained can be easily addressed by simply having a technician remove the clip with the drained battery from a hat, replace it with a new clip with a new battery, and use a tablet or other computing device to indicate that the stream for the hat's wearer should be taken from the replacement device rather than the depleted one. This type of replacement can be performed in less than 30 seconds, without requiring the wearer of the hat to do anything more than stay still enough for the technician to swap devices, and can therefore be much less intrusive than methods which might be performed using devices which rely on external components (e.g., a hat brim camera with an external battery pack located on the user's belt or elsewhere on his or her hat).

With that said, it should be understood that use of the self-contained configuration such as shown in FIG. 6 is not mandatory for obtaining the benefit of the disclosed technology. For example, the problem detection and remediation processes described herein could just as easily be applied in a context where a referee wore an instrumented hat with an external battery pack, or even where video was captured by a device which wasn't head mounted at all (e.g., a body camera with wireless video transmission capabilities). Accordingly, while the self-contained configuration illustrated in FIG. 6 should be understood as a preferred embodiment of device for use on an instrumented hat, the discussion of that configuration should be understood as being illustrative only, and should not be treated as limiting.

In light of the potential for variations and modifications to the material described explicitly herein, the disclosure of this document should not be treated as implying limits on the protection provided by this document or any related document. Instead, the protection provided by a document which claims the benefit of or is otherwise related to this document should be understood as being defined by its claims, when the terms in those claims which are explicitly defined under the "Explicit Definitions" heading are given their explicit definitions, and when all other terms are given their broadest reasonable interpretation as shown by a general purpose dictionary. To the extent that the interpretation which would be given to the claims based on the above disclosure is in any way narrower than the interpretation which would be given based on the explicit definitions under the "Explicit Definitions" heading and the broadest reasonable interpretation as provided by a general purpose dictionary, the interpretation provided by the explicit definitions under the "Explicit Definitions" heading and broadest reasonable interpretation as provided by a general purpose dictionary shall control, and the inconsistent usage of terms in the specification shall have no effect.

EXPLICIT DEFINITIONS

When used in the claims, "based on" should be understood to mean that something is determined at least in part by the thing that it is indicated as being "based on." When a claim is written to require something to be completely determined by a thing, it will be described as being "based EXCLUSIVELY on" the thing.

When used in the claims, a "computer" should be understood to refer to a group of devices (e.g., a device comprising a processor and a memory) capable of storing and executing instructions for performing one or more logical and/or physical operations on data to produce a result. A "computer" may include, for example, a single-core or multi-core microcontroller or microcomputer, a desktop, laptop or tablet computer, a smartphone, a server, or groups of the foregoing devices (e.g., a cluster of servers which are used in combination to perform operations on data for purposes such as redundancy and availability). In the claims, the word "server" should be understood as being a synonym for "computer," and the use of different words should be understood as intended to improve the readability of the claims, and not to imply that a "sever" is not a computer. Similarly, the various adjectives preceding the words "server" and "computer" in the claims are intended to improve readability, and should not be treated as limitations.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Examples of computer readable mediums including the following, each of which is an example of a non-transitory computer readable medium: volatile memory within a computer (e.g., RAM), registers, non-volatile memory within a computer (e.g., a hard disk), distributable media (e.g., CD-ROMs, thumb drives), and distributed memory (e.g., RAID arrays).

When used in the claims, to "configure" a computer should be understood to refer to providing the computer with specific data (which may include instructions) and/or making physical changes in the computer (e.g., adding peripherals) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, "first," "second" and other modifiers which precede nouns or noun phrases should be understood as being labels which are intended to improve the readability of the claims, and should not be treated as limitations. For example, references to a "first communication server" and a "second communication server" should not be understood as requiring that one of the recited servers precedes the other in time, priority, network location, or any other manner.

When used in the claims, "means for detecting and responding to current or incipient problems in wireless communications which could interfere with streaming of video data" should be understood as a means+function limitation as provided for in 35 U.S.C. § 112(f) in which the function is detecting and responding to current or incipient problems in wireless communications which could interfere with streaming of video data" and the corresponding structure is a computer configured to perform processes as illustrated in steps 301, 303, 304 305, 306, 309 and 310 of FIG. 3 and discussed in paragraphs 32-46, and 49.

When used in the claims, "self-contained means for capture and wireless transmission of video" should be understood as a means+function limitation as provided for in 35 U.S.C. § 112(f) in which the function is "capture and wireless transmission of video" and the corresponding structure is a self-contained hat brim enclosure with included components as illustrated in FIGS. 6-15 and described in paragraphs 26 and 62-67.

When used in the claims, a "set" should be understood to refer to a group of one or more things of similar nature, design or function. The words "superset" and "subset" should be understood as being synonyms of "set," and the use of different words should be understood as intended to improve the readability of the claims, and not imply differences in meaning.

What is claimed is:

1. A system for the wireless transmission, reception and processing of video streams, the system comprising:
   (a) a plurality of portable video capture and transmission devices, wherein:
      (i) at least one of the plurality of portable video capture and transmission devices:
         comprises a case which fully encloses video streaming components comprising a control module, a camera, a gyroscope, a power management system, a battery and a radio; and
         is friction fit onto a bill of a hat;
         and
      (ii) each portable video capture and transmission device comprises a camera and a wireless transmitter and is configured to wirelessly stream video data captured by the camera comprised by that portable video capture and transmission device to an access point from a set of wireless access points;
   and
   (b) the set of wireless access points
   wherein:
   (A) each of the portable video capture and transmission devices is configured to wirelessly stream video data along with information indicating, for each frame of the streamed video data, angular velocity of that portable video capture and transmission device when that frame of streamed video data was captured;
   (B) the system comprises one or more servers located remotely from the plurality of portable video capture and transmission devices and configured to perform steps comprising, for each stream of video data from the portable video capture and transmission devices, using a smoothing function which takes angular velocity data as input to crop and translate video frames from that stream of video data.

2. The system of claim 1, wherein the system comprises a command and control computer configured to present an interface to a user which is operable by the user to specify a different reduction in impact of the smoothing function for each portable video capture and transmission device from the plurality of video capture and transmission devices.

* * * * *